US009184846B2

(12) United States Patent
Cole

(10) Patent No.: US 9,184,846 B2
(45) Date of Patent: Nov. 10, 2015

(54) PLUGGABLE OPTICAL HOST AND NETWORK I/O OPTOELECTRONIC MODULE

(71) Applicant: FINISAR CORPORATION, Sunnyville, CA (US)

(72) Inventor: Christopher R. Cole, Redwood City, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 336 days.

(21) Appl. No.: 13/864,985

(22) Filed: Apr. 17, 2013

(65) Prior Publication Data

US 2014/0270765 A1    Sep. 18, 2014

Related U.S. Application Data

(60) Provisional application No. 61/802,682, filed on Mar. 17, 2013.

(51) Int. Cl.
| | |
|---|---|
| *H04J 14/02* | (2006.01) |
| *H04B 10/40* | (2013.01) |
| *H04B 10/27* | (2013.01) |
| *H04L 7/00* | (2006.01) |

(52) U.S. Cl.
CPC ............... *H04B 10/27* (2013.01); *H04B 10/40* (2013.01); *H04J 14/02* (2013.01); *H04L 7/0075* (2013.01)

(58) Field of Classification Search
CPC .................................................... H04B 10/40
See application file for complete search history.

(56) References Cited

U.S. PATENT DOCUMENTS

| | | | | |
|---|---|---|---|---|
| 7,099,382 | B2 * | 8/2006 | Aronson et al. | 375/219 |
| 7,123,806 | B2 * | 10/2006 | Jahn et al. | 385/134 |
| 8,184,987 | B2 * | 5/2012 | Chen et al. | 398/176 |
| 9,054,796 | B2 | 6/2015 | Coli | |
| 2004/0071389 | A1 * | 4/2004 | Hofmeister et al. | 385/16 |
| 2005/0111845 | A1 | 5/2005 | Nelson et al. | |
| 2006/0127100 | A1 * | 6/2006 | Frankel et al. | 398/158 |
| 2008/0063395 | A1 * | 3/2008 | Royle et al. | 398/16 |

(Continued)

FOREIGN PATENT DOCUMENTS

EP    2 056 495  A1    5/2009

OTHER PUBLICATIONS

International Search Report and Written Opinion mailed Jul. 7, 2014 in related PCT Application No. PCT/US2014/030586.

*Primary Examiner* — Nathan Curs
(74) *Attorney, Agent, or Firm* — Maschoff Brennan

(57) ABSTRACT

In an embodiment, a pluggable optical host and network I/O optoelectronic module (hereinafter "module") includes a first optical-electrical-optical (OEO) converter and a second OEO converter. The first OEO converter is configured to convert N inbound optical signals to M inbound optical signals and includes N network-side optical receivers, first signal processing circuitry communicatively coupled to the N network-side optical receivers, and M host-side optical receivers communicatively coupled to the first signal processing circuitry. The second OEO converter is configured to convert M outbound optical signals to N outbound optical signals and includes M host-side optical receivers, second signal processing circuitry communicatively coupled to the M host-side optical receivers, and N network-side optical receivers communicatively coupled to the second signal processing circuitry.

19 Claims, 7 Drawing Sheets

(56) References Cited

U.S. PATENT DOCUMENTS

2010/0092184 A1* 4/2010 Nguyen et al. ............... 398/192
2010/0189433 A1* 7/2010 Trojer .............................. 398/8
2011/0135312 A1* 6/2011 El-Ahmadi et al. .......... 398/135
2013/0129340 A1* 5/2013 Coli .................................. 398/2
2014/0161394 A1* 6/2014 Ho et al. ......................... 385/78

* cited by examiner

PLUGGABLE OPTICAL HOST AND NETWORK I/O OPTOELECTRONIC MODULE

CROSS-REFERENCE TO RELATED APPLICATIONS

This patent application claims the benefit of and priority to U.S. Provisional Patent Application Ser. No. 61/802,682, filed Mar. 17, 2013, which is incorporated herein by reference.

FIELD

The embodiments discussed herein are related to a pluggable optical host and network I/O module.

BACKGROUND

Computing and networking technology have transformed our world. As the amount of information communicated over networks has increased, high-speed transmission has become ever more critical. Many high-speed transmission networks rely on optical communication devices for facilitating transmission over long distances through optical fiber links. Optical networks are thus found in a wide variety of high-speed applications ranging from data center Local Area Networks (LAN) to metro and long haul optical fiber links for Internet, voice and video communications.

Although data is transported in optical networks optically over optical fibers, the data is still processed mainly in the electrical domain at host cards by Application-Specific Integrated Circuits or Physical layer chips (ASIC/PHY chips). As such, the data may be transmitted through electrical traces with losses that increase dramatically with increasing bit rate and traces' lengths. One solution to this problem is to use an electro-optical (EO) conversion chip, also referred to as an EO chip, on the host card, between the ASIC/PHY chip and optical ports facing the optical links, but this solution typically limits the communication to specific link lengths and wavelengths.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Embodiments described herein generally relate to a pluggable optical host and network I/O optoelectronic module.

In an example embodiment, a pluggable optical host and network I/O optoelectronic module includes a first optical-electrical-optical (OEO) converter and a second OEO converter. The first OEO converter is configured to convert N inbound optical signals to M inbound optical signals and includes N network-side optical receivers, first signal processing circuitry communicatively coupled to the N network-side optical receivers, and M host-side optical receivers communicatively coupled to the first signal processing circuitry. The second OEO converter is configured to convert M outbound optical signals to N outbound optical signals and includes M host-side optical receivers, second signal processing circuitry communicatively coupled to the M host-side optical receivers, and N network-side optical receivers communicatively coupled to the second signal processing circuitry.

In another example embodiment, a method of communicating optical signals between a network and a host in a pluggable optical host and network I/O optoelectronic module includes receiving N inbound optical signals from a network. The method also includes converting the N inbound optical signals to M inbound optical signals collectively having at least one characteristic that is changed from the N inbound optical signals. The method also includes emitting the M inbound optical signals to a host. The method also includes receiving M outbound optical signals from the host. The method also includes converting the M outbound optical signals to N outbound optical signals collectively having at least one characteristic that is changed from the M outbound optical signals. The method also includes emitting the N outbound optical signals to the network.

In yet another example embodiment, a pluggable optical host and network I/O optoelectronic module (hereinafter "module") includes N network-side optical receivers configured to receive N inbound optical signals and to convert the N inbound optical signals to N inbound electrical signals. The module also includes first signal processing circuitry communicatively coupled to the N network-side optical receivers and configured to convert the N inbound electrical signals to M inbound electrical signals. The module also includes M host-side optical transmitters communicatively coupled to the first signal processing circuitry and configured to receive the M inbound electrical signals and to convert the M inbound electrical signals to M inbound optical signals. The module also includes M host-side optical receivers configured to receive M outbound optical signals and to convert the M outbound optical signals to M outbound electrical signals. The module also includes second signal processing circuitry communicatively coupled to the M host-side optical receivers and configured to convert the M outbound electrical signals to N outbound electrical signals. The module also includes N network-side optical transmitters communicatively coupled to the second signal processing circuitry and configured to receive the N outbound electrical signals and to convert the N outbound electrical signals to N outbound optical signals.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. Understanding that these drawings depict only several embodiments in accordance with the disclosure and are, therefore, not to be considered limiting of its scope, the disclosure will be described with additional specificity and detail through use of the accompanying drawings, in which.

DETAILED DESCRIPTION OF SOME EXAMPLE EMBODIMENTS

Embodiments described herein generally relate to a pluggable optical host and network I/O optoelectronic module (hereinafter "module"). The module may have optical input/output (I/O) to both a host and a network. In general, the I/O may include 2×N optical signals with the network, including input of N inbound optical signals from the network and output of N outbound optical signals to the network. The I/O may additionally include 2×M optical signals with the host, including output of M inbound optical signals to the host representing the N inbound optical signals and input of M outbound optical signals from the host represented by the N outbound optical signals.

Embodiments described herein may alleviate the problem of physics barriers to the reach and speed of electrical interfaces. Optics are typically implemented to go across datacenter reaches and may also be implemented to go across host card reaches, e.g., between host ASICs and pluggable modules. Some embodiments described herein preserve the benefits of pluggable optics for datacenter reaches, with the benefits of low-cost card-mounted optics for intra-card reaches.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
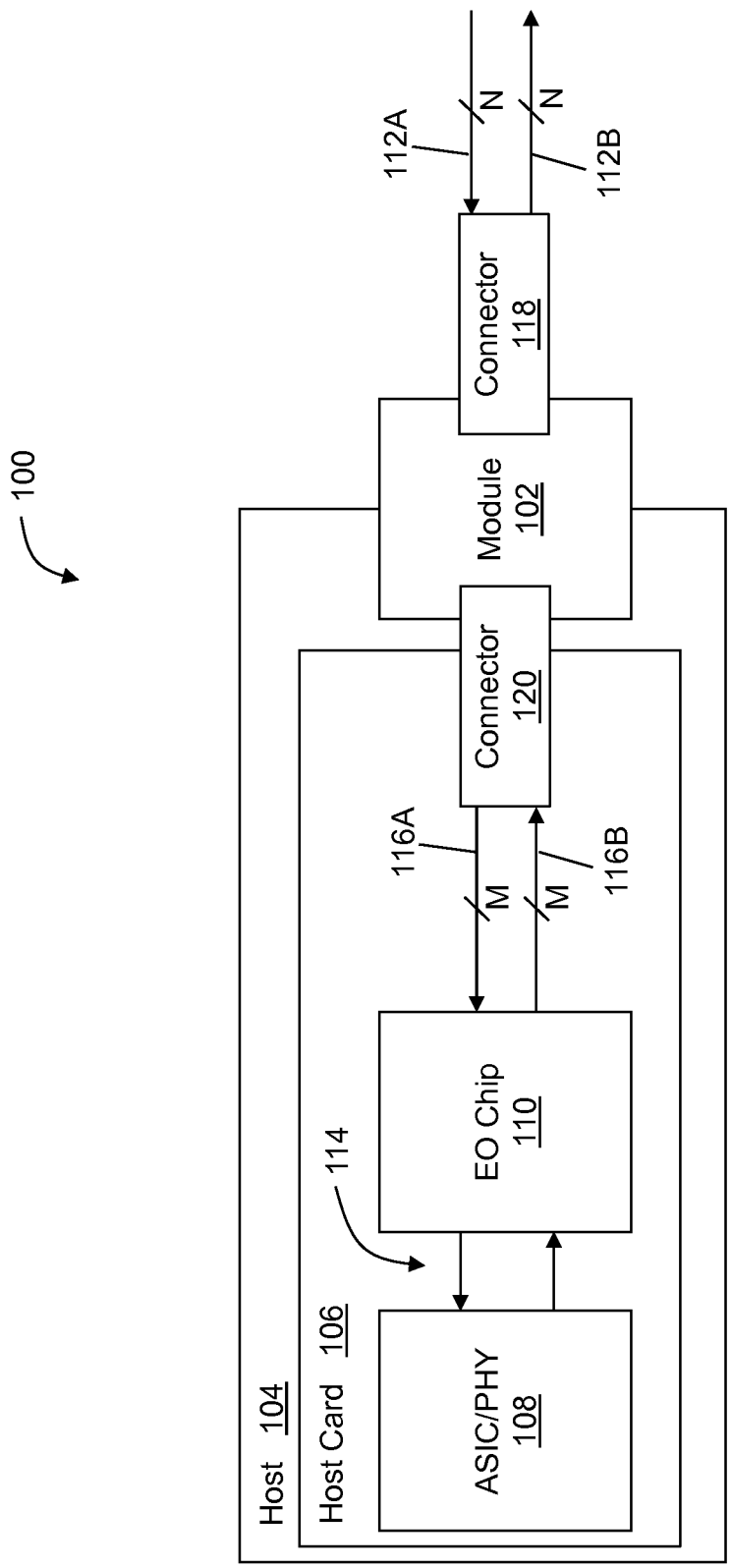
FIG. 1 illustrates an example operating environment including a pluggable optical host and network I/O optoelectronic module (hereinafter "module") communicatively coupled to an external host including a host card.

FIG. 1 illustrates an example operating environment 100 including a pluggable optical host and network I/O optoelectronic module 102 (hereinafter "module 102") communicatively coupled to an external host 104 including a host card 106, arranged in accordance with at least some embodiments described herein. As illustrated, the host card 106 includes an ASIC/PHY chip 108 and an EO chip 110. Although a single module 102 is illustrated in FIG. 1, more generally, one or more modules 102 may be communicatively coupled to the host 104. Each of the one or more modules 102 may include one or more components as discussed below.

In general, the host card 106 is configured to transmit data to and receive data from a network in the form of N inbound optical signals 112A and N outbound optical signals 112B (collectively "network-side optical signals 112"). The network-side optical signals 112 may be carried over one or more optical fibers. For example, each of the network-side optical signals 112 may be carried on a different optical fiber. As another example, in wavelength division multiplexing (WDM) systems, all of the network-side optical signals 112 may be carried on a single optical fiber, or the N inbound optical signals 112A may be carried on a first optical fiber while the N outbound optical signals 112B may be carried on a second optical fiber.

The data transmitted to and received from the network may be variously embodied as, e.g., high bandwidth electrical data signals 114 between the ASIC/PHY chip 108 and the EO chip 110, M inbound optical signals 116A and/or M outbound optical signals 116B (collectively "host-side optical signals 116") between the EO chip 110 and the module 102, and the network-side optical signals 112.

In a receive or inbound direction (e.g., from the network to the ASIC/PHY chip 108), the module 102 is generally configured to convert the N inbound optical signals 112A to the M inbound optical signals 116A for reception by the host 104. The N inbound optical signals 112A may be carried to the module 102 by one or more single-mode fibers (SMFs) or multi-mode fibers (MMFs) coupled to the module 102 by a connector 118. Converting the N inbound optical signals 112A to the M inbound optical signals 116A may include one or more of: changing a signal modulation, changing a per-channel symbol rate, changing a channel number, and/or changing a per-channel bit rate as described in more detail below.

The module 102 emits the M inbound optical signals 116A to the EO chip 110, which are carried over one or more optical fibers. For example, the M inbound optical signals 116A may each be carried on a different one of multiple multi-mode fibers (MMFs) coupled to the module 102 by a connector 120 or multiple connectors.

The EO chip 110 is configured to receive and convert the M inbound optical signals 116A to one or more of the high bandwidth electrical data signals 114 that are provided to the ASIC/PHY chip 108.

In a transmit or outbound direction (e.g., from the ASIC/PHY chip 108 to the network), the ASIC/PHY chip 108 is configured to generate outbound electrical signals which are provided to the EO chip 110 as one or more high bandwidth electrical data signals 114. Although a single high bandwidth electrical data signal 114 is represented in each direction between the ASIC/PHY chip 108 and the EO chip 110, more generally, the high bandwidth electrical data signals 114 may include one or more high bandwidth electrical data signals 114 in each direction.

The EO chip 110 is configured to receive and convert the one or more of the high bandwidth electrical data signals 114 received from the ASIC/PHY chip 108 to the M outbound optical signals 116B that are provided to the module 102 over one or more optical fibers through the connector 120 to the module 102.

The module 102 is generally configured to convert the M outbound optical signals 116B to the N outbound optical signals 112B for transmission to the network. The N outbound optical signals 112B may be carried to the network by one or more single-mode fibers (SMFs) or multi-mode fibers (MMFs) coupled to the module 102 by the connector 118. Converting the M outbound optical signals 116B to the N outbound optical signals 112B may include one or more of: changing a signal modulation, changing a per-channel symbol rate, changing a channel number, and/or changing a per-channel bit rate as described in more detail below.

Accordingly, the module 102 is configured to convert the N inbound optical signals 112A to the M inbound optical signals 116A with at least one different characteristic and to convert the M outbound optical signals 116B to the N outbound optical signals 112B also with at least one different characteristic. As one example, N and M may both be equal to sixteen where each of the N inbound optical signals 112A and each of the N outbound optical signals 112B may include an optical signal with a symbol rate of 50 gigabaud (GBaud) and PAM-4 modulation, and where each of the M outbound optical signals 116B and each of the M inbound optical signals 116A includes a 100 gigabit per second (G) optical data signal with non-return to zero (NRZ) modulation. Aspects of the foregoing signal modulations and, more generally, higher-order modulation (HOM) for client optics are disclosed in Cole et al: Higher-Order Modulation for Client Optics, IEEE Communications Magazine, March 2013, pp. 50-57, which is herein incorporated by reference.

Optionally, a low-speed electrical interface (not shown) may be provided between the host card 106 and the module 102 over which low-speed data signals (such as alarms/warnings, controls and digital diagnostic monitoring, and the like) may be communicated electrically between the host card 106 and the module 102. Alternately or additionally, the low-speed data may be communicated optically between the module 102 and the host card 106. When communicated optically, the low-speed data may be communicated out-of-band in either or both directions on one or more of the host-side optical signals 116 or over one or more dedicated optical fibers.

Although not required, the module 102 may optionally include a management interface including a control module, one or more pins of the module 102, and/or a memory, as described in more detail in U.S. patent application Ser. No. 13/678,361, filed Nov. 15, 2012, which application is herein incorporated by reference. In some embodiments, the module 102 and/or multiple modules 102 coupled to the same host 104 may be used to drop and retransmit signals, as described in U.S. patent application Ser. No. 13/678,361.

Figure 2:
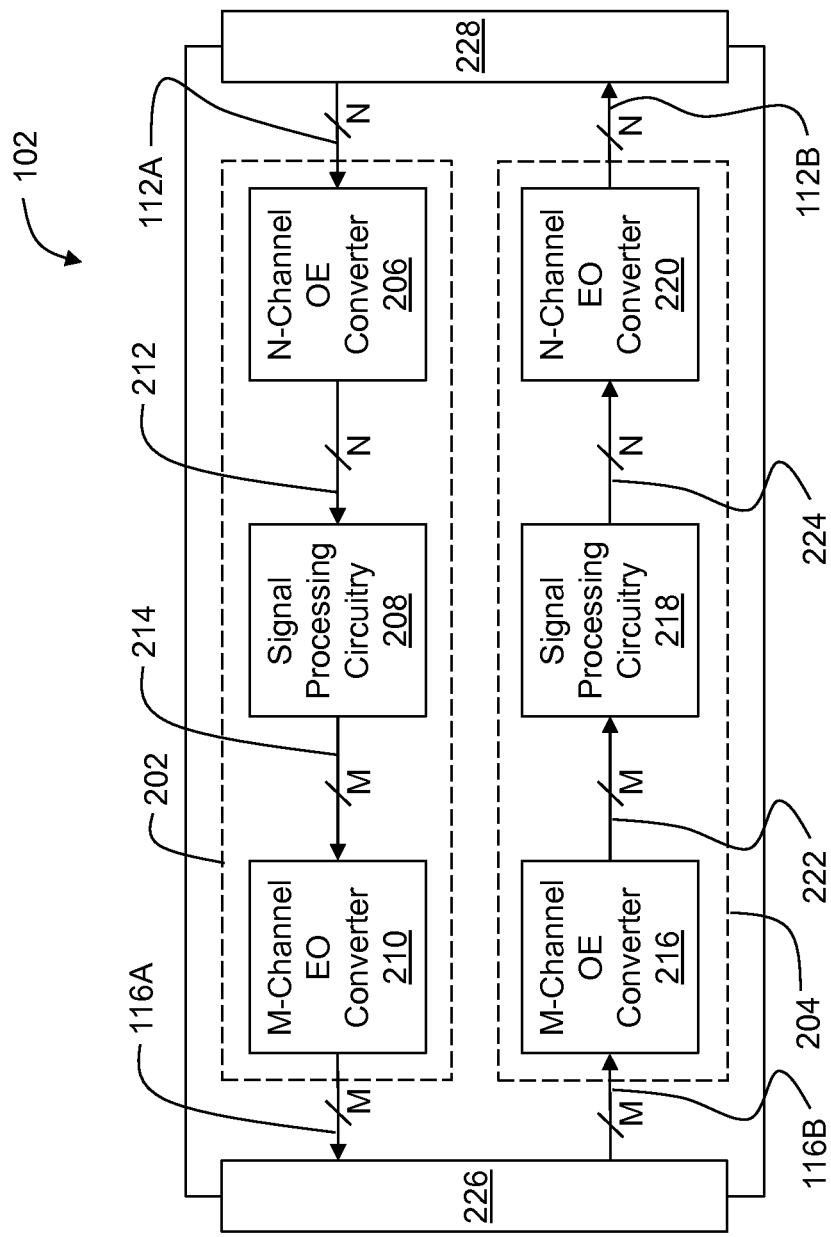
FIG. 2 illustrates an example embodiment of the module of FIG. 1.

FIG. 2 illustrates an example embodiment of the module 102 of FIG. 1, arranged in accordance with at least some embodiments described herein. While the module 102 will be described in some detail, the module 102 is described by way of illustration only, and not by way of restricting the scope of the invention. The principles of the example embodiments described herein are suitable for any bit rate, i.e., 1 G, 2 G, 4 G, 8 G, 10 G, 16 G, 28 G, 40 G, 100 G, and higher or other bit rates. Furthermore, the principles described herein may be implemented in modules of any form factor such as XFP, SFP, SFF, SFP+, QSFP+, CFP, and active optical cables, without restriction. It will be appreciated, however, that the module 102 need not comply with standardized form factor requirements and may have any size or configuration necessary according to a particular design.

As used herein, bit rates such as 40 G, 100 G, etc. may represent rounded approximations of common bit rates and may have the meanings commonly understood by those of skill in the art. In particular, the terms "40 G" and "100 G" refer to data rates substantially equal to, respectively, 40 G and 100 G. For instance, the term "40 G" may be understood to refer to about 39.813 gigabits per second and the term "100 G" may be understood to refer to 103.125 gigabits per second. Other bit rates and/or symbol rates used herein may similarly represent rounded approximations of common bit rates and/or symbol rates and/or may similarly have the meanings commonly understood by those of skill in the art.

In the illustrated embodiment, the module 102 includes a first optical-electrical-optical (OEO) converter 202 and a second OEO converter 204. The first OEO converter 202 is configured to convert the N inbound optical signals 112A to the M inbound optical signals 116A. Accordingly, the first OEO converter 202 may include an N-channel optical-electrical (OE) converter 206, first signal processing circuitry 208, and an M-channel EO converter 210.

The N-channel OE converter 206 may include N optical receivers, which may be referred to herein as "N network-side optical receivers." The N-channel OE converter 206 may be configured to receive the N inbound optical signals 112A and to convert the N inbound optical signals 112A to N inbound electrical signals 212.

The first signal processing circuitry 208 is communicatively coupled to the N-channel OE converter 206. The first signal processing circuitry 208 is configured to convert the N inbound electrical signals 212 to M inbound electrical signals 214.

The M-channel EO converter 210 is communicatively coupled to the first signal processing circuitry 208 and may include M optical transmitters, which may be referred to herein as "M host-side optical transmitters." The M-channel EO converter 210 may be configured to receive the M inbound electrical signals 214 and to convert the M inbound electrical signals 214 to the M inbound optical signals 116A.

Analogously, the second OEO converter 204 is configured to convert the M outbound optical signals 116B to the N outbound optical signals 112B. Accordingly, the second OEO converter 204 may include an M-channel OE converter 216, second signal processing circuitry 218, and an N-channel EO converter 220.

The M-channel OE converter 216 may include M optical receivers, which may be referred to herein as "M host-side optical receivers." The M-channel OE converter 216 may be configured to receive the M outbound optical signals 116B and to convert the M outbound optical signals 116B to M outbound electrical signals 222.

The second signal processing circuitry 218 is communicatively coupled to the M-channel OE converter 216. The second signal processing circuitry 218 is configured to convert the M outbound electrical signals 222 to N outbound electrical signals 224.

The N-channel EO converter 220 is communicatively coupled to the second signal processing circuitry 218 and may include N optical transmitters, which may be referred to herein as "N network-side optical transmitters." The N-channel EO converter 220 may be configured to receive the N outbound electrical signals 224 and to convert the N outbound electrical signals 224 to the N outbound optical signals 112B.

In some embodiments, N is not equal to M. In other embodiments, N is equal to M.

In the illustrated embodiment of FIG. 2, the module 102 additionally includes a host-side receptacle 226 and a network-side receptacle 228. Alternately, the module 102 may include multiple host-side receptacles 226 and/or multiple network-side receptacles 228. In general, each of the host-side receptacle 226 and the network-side receptacle 228 is configured to receive one or more optical fiber connectors to couple optical signals into or out of the module 102 from or into one or more optical fibers.

For example, the host-side receptacle 226 may be configured to receive a 2×M multiple-fiber push-on/pull-off (MPO) MMF connector, where each of the M inbound optical signals is emitted through the 2×M MPO MMF connector onto a corresponding one of M inbound MMF optical fibers and each of the M outbound optical signals is received through the 2×M MPO MMF connector from a corresponding one of M outbound MMF optical fibers. In this example, M may be equal to 16. Alternately or additionally, the network-side receptacle 228 may be configured to receive a 2×1 Little Connector (or Lucent Connector) (LC) connector, where the N inbound optical signals are received through the 2×1 LC connector from a first SMF on which the N inbound optical signals are wavelength multiplexed and the N outbound optical signals are emitted through the 2×1 LC connector into a second SMF on which the N outbound optical signals are wavelength multiplexed. In this example, N may also be equal to 16. Alternately or additionally, M and/or N may be unequal and/or may be equal to a number different than 16.

Although not illustrated, in these and other embodiments, the module 102 may further include a 1×N wavelength division demultiplexer positioned in an optical path of the N inbound optical signals between the 2×1 LC connector (or other connector) and the first OEO converter 202 so as to separate out the wavelength multiplexed N inbound optical signals into different optical paths for separate processing by the N-channel OE converter 206. Alternately or additionally, the module 102 may further include an N×1 wavelength division multiplexer positioned in an optical path of the N outbound optical signals between the 2×1 LC connector (or other connector) and the second OEO converter 204 so as to combine (e.g., wavelength multiplex) the N outbound optical signals into a single optical path for transmission on a single optical fiber.

The N and M optical receivers included in the N-channel OE converter 206 and the M-channel OE converter 216 may each include any suitable optical receiver for converting optical signals to electrical signals. For instance, each of the optical receivers may include, but is not limited to, a PIN photodiode, an avalanche photodiode, or the like. Alternately or additionally, the N-channel OE converter 206 and/or the M-channel OE converter 216 may each include a coherent receiver architecture.

The M and N optical transmitters included in the M-channel EO converter 210 and the N-channel EO converter 220 may be the same or different and/or may each include any suitable optical transmitter for converting electrical signals to optical signals. For instance, each of the optical transmitters may include, but is not limited to, a Fabry-Perot (FP) laser, a distributed feedback (DFB) laser, a distributed Bragg reflector (DBR) laser, a vertical cavity surface-emitting laser (VCSEL), an electro-absorption modulator laser (EML), a laser with Mach-Zehnder modulator (MZM), a chirp-managed laser (CML), or the like or any combination thereof.

Figure 3A:
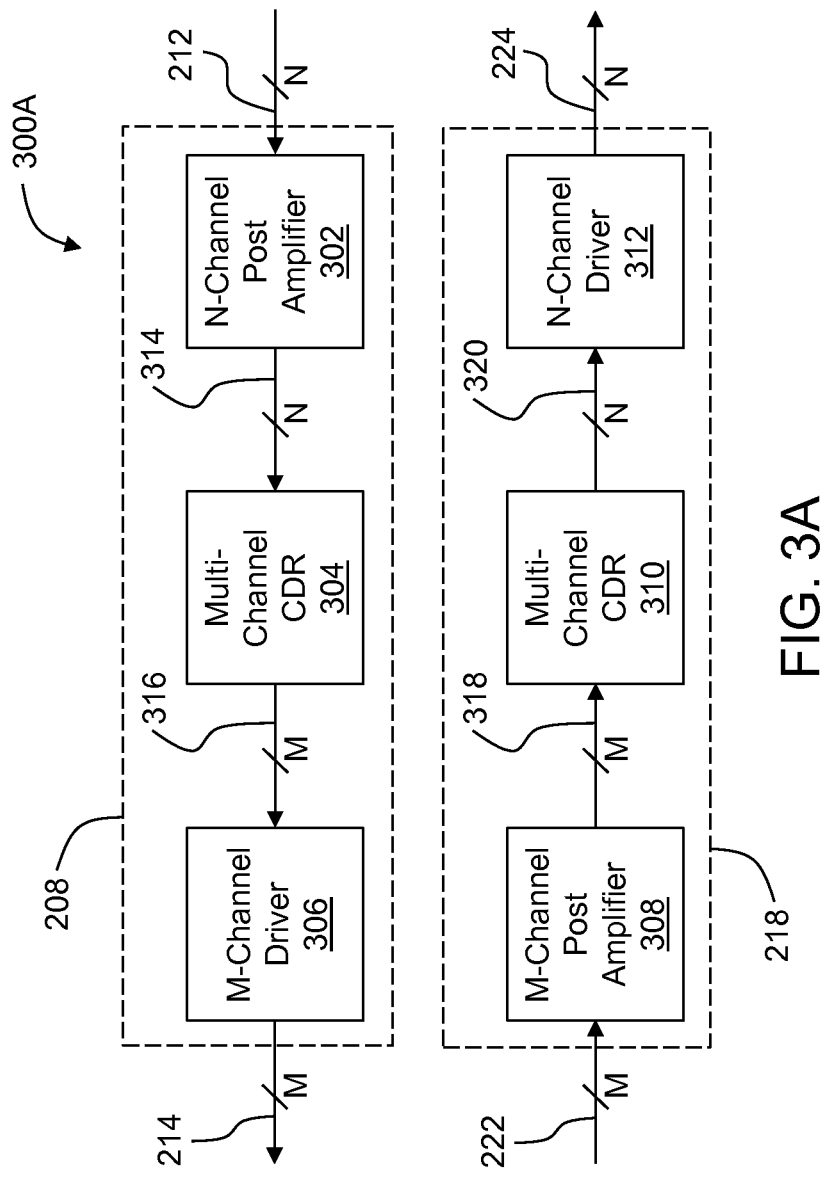
FIGS. 3A-3D illustrate example configurations for signal processing circuitry that may be included in the module of FIG. 2.

FIGS. 3A-3D illustrate example configurations 300A-300D for the first and second signal processing circuitries 208, 218 of FIG. 2, arranged in accordance with at least some embodiments described herein. In the configuration 300A of FIG. 3A, the first signal processing circuitry 208 includes an N-channel post amplifier 302, a first multi-channel clock and data recovery circuit (CDR) 304, and an M-channel driver 306. Analogously, the second signal processing circuitry 218 includes an M-channel post amplifier 308, a second multi-channel CDR 310, and an N-channel driver 312. In the configuration of FIG. 3A, M is equal to N; however, "M" and "N" will continue to be separately used in the discussion of FIG. 3A for consistency with the claims and the rest of the detailed description.

On the receive or inbound side, the N-channel post amplifier 302 may include N post amplifiers, which may be referred to herein as "N network-side post amplifiers." The N-channel post amplifier 302 may be communicatively coupled to the N-channel OE converter 206 of FIG. 2, which may include N network-side optical receivers in some embodiments. The N-channel post amplifier 302 is configured to amplify the N inbound electrical signals 212 to generate N amplified signals 314 and to provide the N amplified signals 314 to the first multi-channel CDR 304.

The first multi-channel CDR 304 is communicatively coupled to the N-channel post amplifier 302. The first multi-channel CDR 304 may, in some embodiments, reshape and retime the N amplified signals 314 to generate M reshaped and retimed signals 316 and/or may perform other signal conditioning. The M reshaped and retimed signals 316 are provided to the M-channel driver 306.

The M-channel driver 306 may include M drivers, which may be referred to herein as "M host-side drivers." The M-channel driver 306 may be communicatively coupled to the first multi-channel CDR 304 and to the M-channel EO converter 210 of FIG. 2, which may include M host-side optical transmitters. The M-channel driver 306 generates the M inbound electrical signals 214 that drive the M host-side optical transmitters of the M-channel EO converter 210.

On the transmit or outbound side, the M-channel post amplifier 308 may include M post amplifiers, which may be referred to herein as "M host-side post amplifiers." The M-channel post amplifier 308 may be communicatively coupled to the M-channel OE converter 216 of FIG. 2, which may include M host-side optical receivers in some embodiments. The M-channel post amplifier 308 is configured to amplify the M outbound electrical signals 222 to generate M amplified signals 318 and to provide the M amplified signals 318 to the second multi-channel CDR 310.

The second multi-channel CDR 310 is communicatively coupled to the M-channel post amplifier 308. The second multi-channel CDR 310 may, in some embodiments, reshape and retime the M amplified signals 318 to generate N reshaped and retimed signals 320 and/or may perform other signal conditioning. The N reshaped and retimed signals 320 are provided to the N-channel driver 312.

The N-channel driver 312 may include N drivers, which may be referred to herein as "N network-side drivers." The N-channel driver 312 may be communicatively coupled to the second multi-channel CDR 310 and to the N-channel EO converter 220 of FIG. 2, which may include N network-side optical transmitters. The N-channel driver 312 generates the N outbound electrical signals 224 that drive the N network-side optical transmitters of the N-channel EO converter 220.

In embodiments in which M is not equal to N, the first signal processing circuitry 208 may further be configured to change a number of inbound channels (e.g., the N amplified signals 314) from N to M and the second signal processing circuitry 208 may further be configured to change a number of outbound channels (e.g., the M amplified signals 318) from M to N. Indeed, FIG. 3A is a specific case, in which M is equal to N, of a more general case illustrated in FIG. 3B and described in greater detail below.

Each of the M host-side drivers and/or the N network-side drivers and/or other drivers described herein may include any suitable driver. Examples include, but are not limited to, a DML driver, an EA-modulated laser driver, an EML driver, a CML driver, or the like or any combination thereof.

Figure 3B:
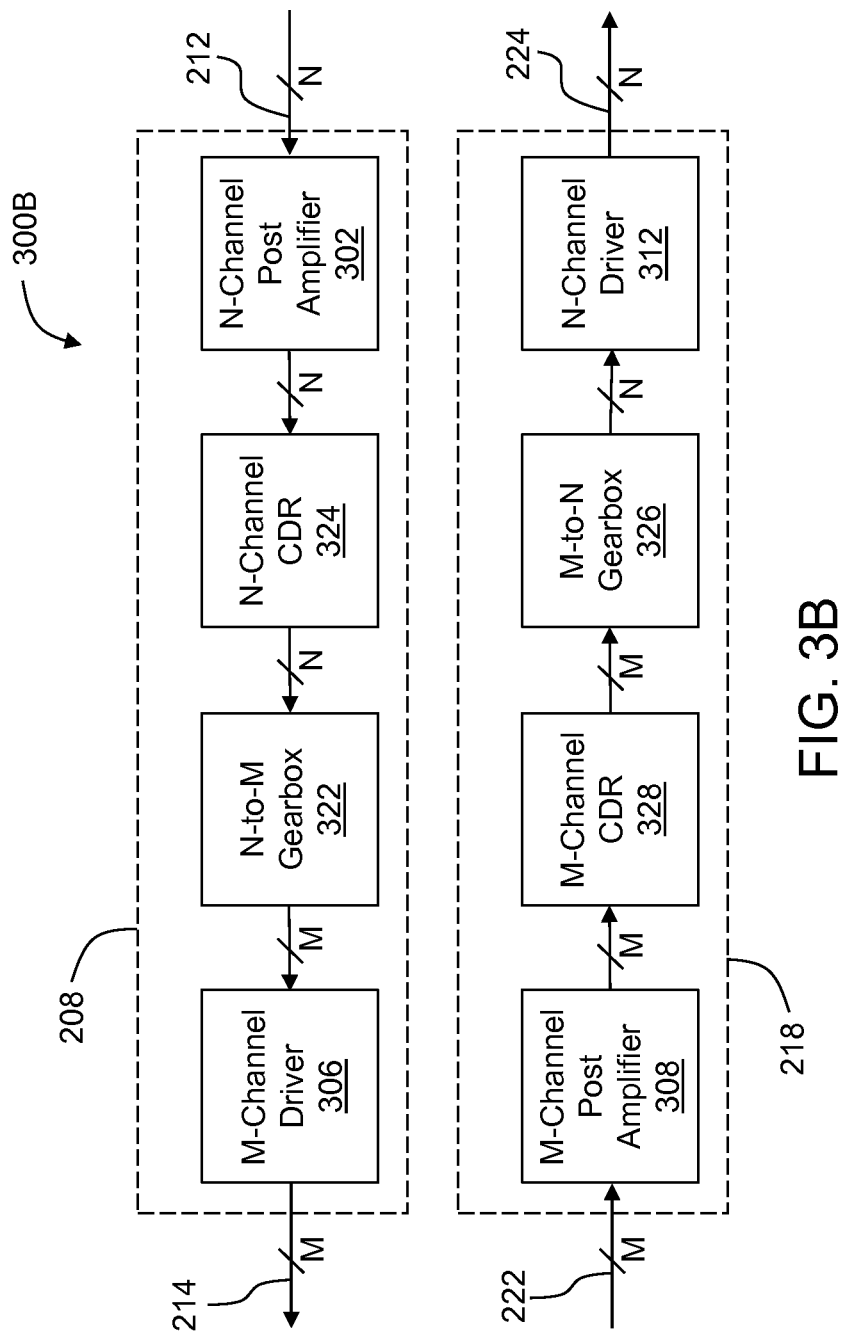

Alternately or additionally, an N-to-M gearbox and/or an M-to-N gearbox may be provided in one or both of the inbound and/or outbound directions. For example, FIG. 3B illustrates a configuration 300B in which an N-to-M gearbox 322 is communicatively coupled between an N-channel CDR 324 and the M-channel driver 306 and an M-to-N gearbox 326 is coupled between an M-channel CDR 328 and the N-channel driver 312. In general, the N-to-M gearbox 322 is configured to convert N electrical signals to M electrical signals, while the M-to-N gearbox 326 is configured to convert M electrical signals to N electrical signals.

Figure 3C:
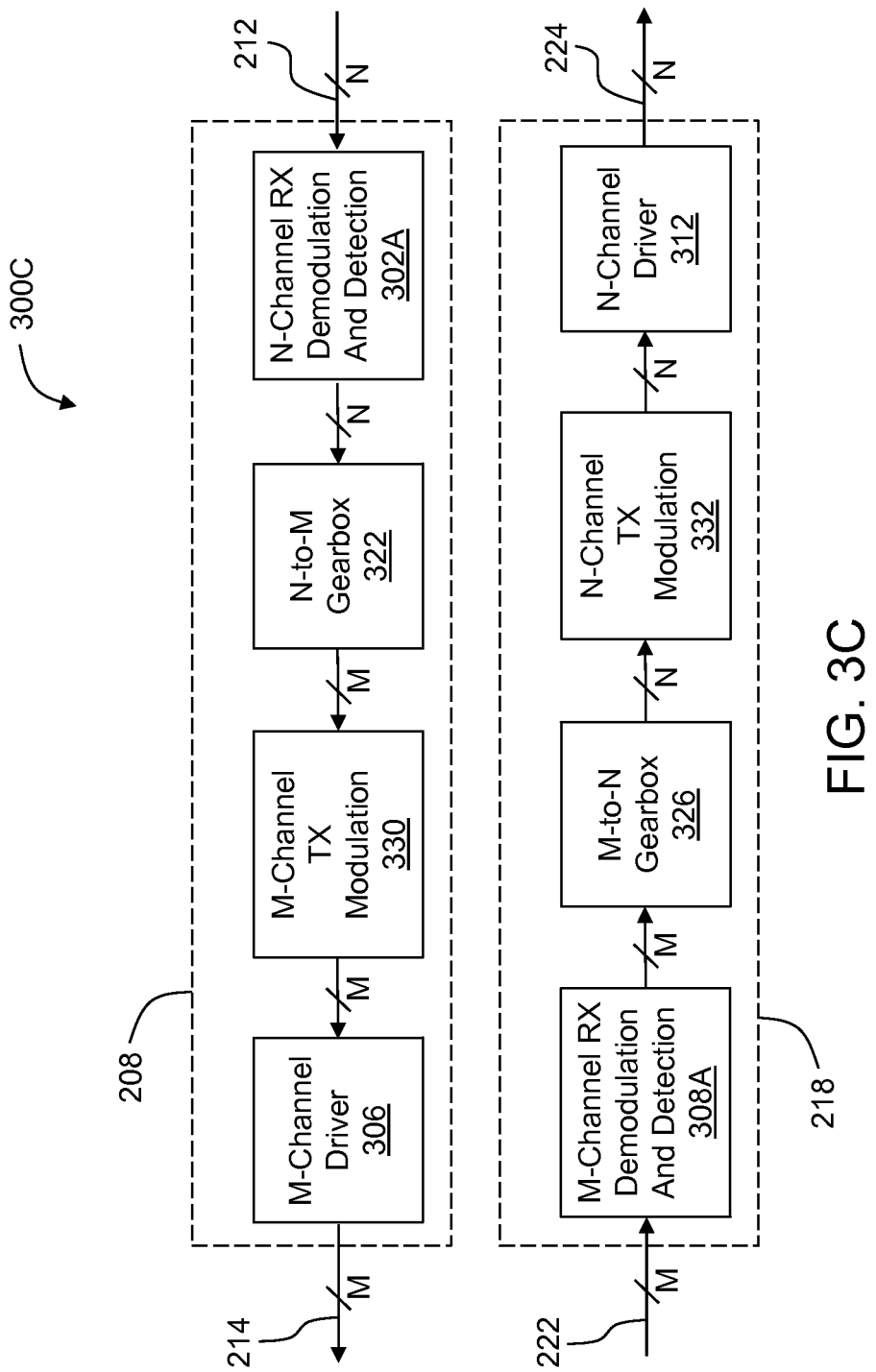

FIG. 3C illustrates a configuration 300C in which the first signal processing circuitry 208 includes an N-channel receive (RX) demodulation and detection block 302A, the N-to-M gearbox 322, an M-channel transmit (TX) modulation block 330, and the M-channel driver 306, and in which the second signal processing circuitry 218 includes an M-channel RX demodulation and detection block 308A, the M-to-N gearbox 326, N-channel TX modulation block 332, and the N-channel driver 312.

The N-channel RX demodulation and detection block 302A broadly encompasses any suitable configuration for demodulating and detecting bits in each of the N inbound electrical signals 212 output by the N-channel OE converter 206 of FIG. 2. The N-channel post amplifier 302 of FIGS. 3A and 3B is one example of the N-channel RX demodulation and detection block 302A. The N-channel RX demodulation and detection block 302A may include, but is not limited to, an N-channel transimpedance amplifier (TIA), an RX digital signal processor (DSP), a forward error correction (FEC) decoder, or the like or any combination thereof.

The M-channel TX modulation block 330 is configured to encode and otherwise process electrical data signals for modulation before providing them to the M-channel driver 306. The M-channel TX modulation block 330 may include, but is not limited to, an FEC encoder, a TX DSP, or the like or any combination thereof.

Analogously, the M-channel RX demodulation and detection block 308A broadly encompasses any suitable configuration for demodulating and detecting bits in each of the M outbound electrical signals 222 output by the M-channel OE converter 216 of FIG. 2. The M-channel post amplifier 308 of FIGS. 3A and 3B is one example of the M-channel RX demodulation and detection block 308A. The M-channel RX demodulation and detection block 308A may include, but is not limited to, an M-channel TIA, an RX DSP, an FEC decoder, or the like or any combination thereof.

The N-channel TX modulation block 332 is configured to encode and otherwise process electrical data signals for modulation before providing them to the N-channel driver 312. The N-channel TX modulation block 332 may include, but is not limited to, an FEC encoder, a TX DSP, or the like or any combination thereof.

Figure 3D:
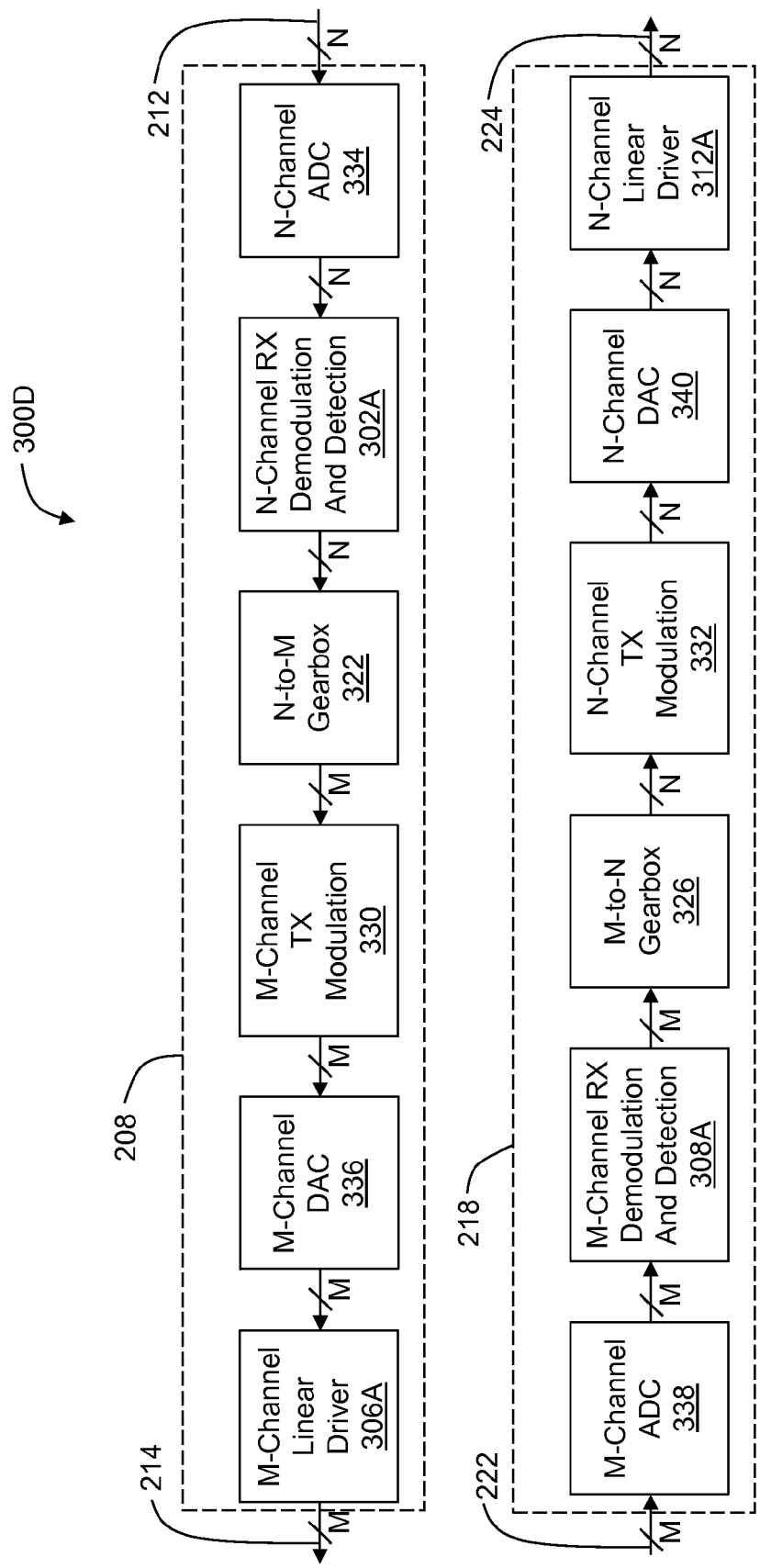

FIG. 3D illustrates a configuration 300D that is similar in some respects to the configuration 300C of FIG. 3C, although with additional components that allow for digital signal processing in both directions. More particularly, in the first signal processing circuitry 208 of FIG. 3D, an N-channel analog-to-digital converter (ADC) 334 is coupled between the N-channel OE converter 206 of FIG. 2 and the N-channel RX demodulation and detection block 302A. Additionally, an M-channel digital-to-analog converter (DAC) 336 is coupled between the M-channel TX modulation block 330 and an M-channel linear driver 306A.

In the second signal processing circuitry 218, an M-channel ADC 338 is coupled between the M-channel OE converter 216 of FIG. 2 and the M-channel RX demodulation and detection block 308A. Further, an N-channel DAC 340 is coupled between the N-channel TX modulation block 332 and an N-channel linear driver 312A.

The N-channel ADC 334 and the M-channel DAC 336 respectively convert analog electrical signals to digital electrical signals and vice versa, allowing the N-channel RX demodulation and detection block 302A, the N-to-M gearbox 322, and the M-channel TX modulation block 330 to process digital signals. Analogously, the M-channel ADC 338 and the N-channel DAC 340 respectively convert analog electrical signals to digital electrical signals and vice versa, allowing the M-channel RX demodulation and detection block 308A, the M-to-N gearbox 326, and the N-channel TX modulation block 332 to process digital signals. In some embodiments, the N-channel ADC 334 and the M-channel ADC 338 may each provide pre-amplification, such as may be provided, respectively, by the N-channel post amplifier 302 and the M-channel post amplifier 308 of FIG. 3B.

The M-channel linear driver 306A is a specific example of the M-channel driver 306 of FIGS. 3A-3C in which the M-channel linear driver 306A has a linear response. Analogously, the N-channel linear driver 312A is a specific example of the N-channel driver 312 of FIGS. 3A-3C in which the N-channel linear driver 312A has a linear response.

The first and second signal processing circuitries 208, 218 of FIGS. 2-3D may be implemented in a single integrated circuit (IC) or across multiple ICs, without restriction. Alternately or additionally, the corresponding CDR, and/or the TX modulation block included in each of the first and second signal processing circuitries 208, 218 may condition and/or configure optical signals emitted by a corresponding downstream component (e.g., the M-channel EO converter 210 and/or the N-channel EO converter 220) for corresponding conditions (e.g., link length, wavelength channel, etc.) of the emitted optical signals.

Figure 4:
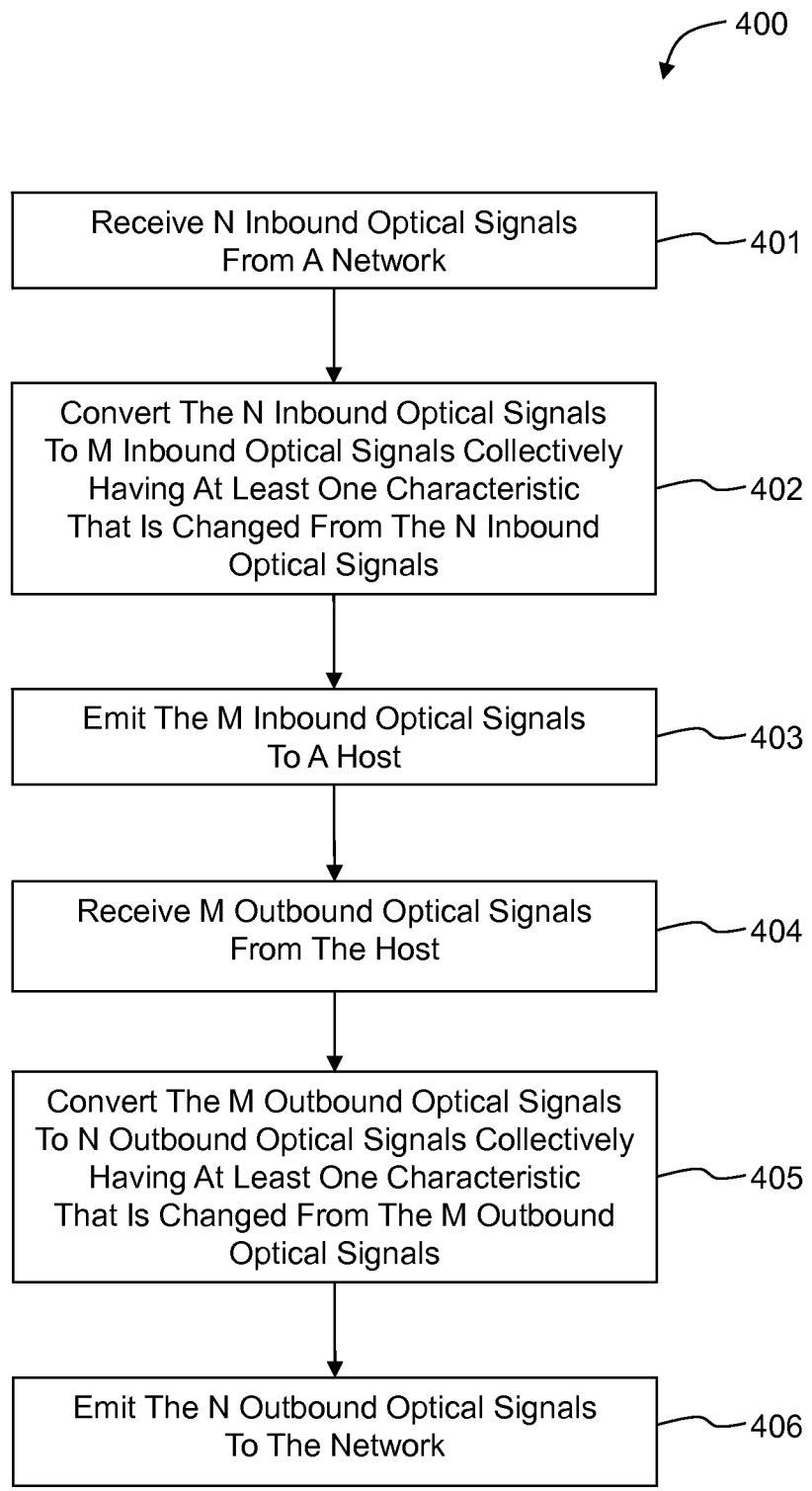
FIG. 4 is a flowchart of an example method of communicating optical signals between a network and a host in a pluggable optical host and network I/O optoelectronic module.

FIG. 4 is a flowchart of an example method 400 of communicating optical signals between a network and a host in a pluggable optical host and network I/O optoelectronic module (hereinafter "module"), arranged in accordance with at least some embodiments described herein. The method 400 may be performed in whole or in part by the first OEO converter 202, the second OEO converter 204, and/or the module 102. Although illustrated as discrete blocks, various blocks may be divided into additional blocks, combined into fewer blocks, or eliminated, depending on the desired implementation.

The method may begin at block 401 in which N inbound optical signals are received from a network.

At block 402, the N inbound optical signals may be converted to M inbound optical signals collectively having at least one characteristic that is changed from the N inbound optical signals. The at least one characteristic that is changed may include any one or more of: signal modulation, per-channel symbol rate, total channel number, and/or per-channel bit rate.

At block 403, the M inbound optical signals are emitted to a host.

At block 404, M outbound optical signals are received from the host.

At block 405, the M outbound optical signals are converted to N outbound optical signals collectively having at least one characteristic that is changed from the M outbound optical signals. The at least one characteristic that is changed may include any one or more of: signal modulation, per-channel symbol rate, total channel number, and/or per-channel bit rate.

At block 406, the N outbound optical signals may are emitted to the network.

In some embodiments, block 402 may include changing a signal modulation from a first signal modulation in the N inbound optical signals to a different second signal modulation in the M inbound optical signals. In these and other embodiments, block 405 may include changing a signal modulation from the second signal modulation in the M outbound optical signals to the first signal modulation in the N outbound optical signals. Examples of different signal modulations include, but are not limited to, return to zero (RZ) modulation; NRZ modulation; M-ary pulse amplitude modulation (PAM), such as PAM-4 modulation and PAM-8 modulation; M-ary phase shift keying (PSK), such as PSK-4 (also known as quadrature phase shift keying (QPSK)), PSK-8, differential QPSK (DQPSK), and dual-polarization QPSK (DP-QPSK); quadrature amplitude modulation (QAM), such as QAM-16; carrierless amplitude and phase (CAP) modulation; discrete multitone (DMT); and the like or any combination thereof.

Alternately or additionally, block 402 may include changing a per-channel symbol rate from a first per-channel symbol rate in the N inbound optical signals to a different second per-channel symbol rate in the M inbound optical signals. In these and other embodiments, block 405 may include changing a per-channel symbol rate from the second per-channel symbol rate in the M outbound optical signals to the first per-channel symbol rate in the N outbound optical signals. For example, the first per-channel symbol rate may be 50 GBaud and the second per-channel symbol rate may be 100 GBaud, or the first and second per-channel symbol rates may be some other symbol rates.

Alternately or additionally, block 402 may include changing a channel number from N channels in the N inbound optical signals to M channels in the M inbound optical signals. As used herein, "channel" may refer to a discrete data-carrying signal whether on a different physical channel from other signals, on the same physical channel as other signals but on a different wavelength channel, or the like. In these and other embodiments, block 405 may include changing a channel number from M channels in the M outbound optical signals to N channels in the N outbound optical signals.

Alternately or additionally, block 402 may include changing a per-signal bit rate from a first per-signal bit rate in the N inbound optical signals to a different second per-signal bit rate in the M inbound optical signals. In these and other embodiments, block 405 may include changing a per-signal bit rate from the second per-signal bit rate in the M outbound optical signals to the first per-signal bit rate in the N outbound optical signals. For example, if an aggregate bit rate of the N inbound or outbound optical signals is 100 G and an aggregate bit rate of the M inbound or outbound optical signals is also 100 G, and if N is 5 and M is 10, the first per-signal bit rate may be 20 G while the second per-signal bit rate may be 10 G. The specific values of the first and second bit rates may generally depend on the aggregate bit rate and the number of channels N or M.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pluggable optical host and network I/O optoelectronic module comprising:
   a first optical-electrical-optical (OEO) converter configured to convert N inbound optical signals to M inbound optical signals, the first OEO converter comprising:
   N network-side optical receivers;
   first signal processing circuitry communicatively coupled to the N network-side optical receivers; and
   M host-side optical transmitters communicatively coupled to the first signal processing circuitry; and
   a second OEO converter configured to convert M outbound optical signals to N outbound optical signals, the second OEO converter comprising:
   M host-side optical receivers;
   second signal processing circuitry communicatively coupled to the M host-side optical receivers; and
   N network-side optical transmitters communicatively coupled to the second signal processing circuitry.

2. The pluggable optical host and network I/O optoelectronic module of claim 1, wherein:
   each of the N inbound optical signals and each of the N outbound optical signals comprises a 50 gigabaud (GBaud) optical data signal with PAM-4 modulation; and
   each of the M outbound optical signals and each of the M inbound optical signals comprises a 100 gigabit per second optical data signal with non-return to zero (NRZ) modulation.

3. The pluggable optical host and network I/O optoelectronic module of claim 1, wherein M is equal to N.

4. The pluggable optical host and network I/O optoelectronic module of claim 1, wherein:
   the first signal processing circuitry includes:
   N network-side post amplifiers communicatively coupled to the N network-side optical receivers;
   a first clock and data recovery circuit (CDR) communicatively coupled to the N network-side post amplifiers; and
   M host-side drivers communicatively coupled to the first CDR and to the M host-side optical transmitters; and
   the second signal processing circuitry includes:
   M host-side post amplifiers communicatively coupled to the M host-side optical receivers;
   a second CDR communicatively coupled to the M host-side post amplifiers; and
   N network-side drivers communicatively coupled to the second CDR and to the N network-side optical transmitters.

5. The pluggable optical host and network I/O optoelectronic module of claim 4, wherein:
   N is not equal to M;
   the first signal processing circuitry further includes an N-to-M gearbox coupled between the first CDR and the M host-side drivers; and
   the second signal processing circuitry further includes an M-to-N gearbox coupled between the second CDR and the N network-side drivers.

6. The pluggable optical host and network I/O optoelectronic module of claim 1, wherein the first OEO is configured to convert the N inbound optical signals to M inbound optical signals by performing at least one of:
   changing a signal modulation from a first signal modulation in the N inbound optical signals to a different second signal modulation in the M inbound optical signals;
   changing a per-channel symbol rate from a first per-channel symbol rate in the N inbound optical signals to a different second per-channel symbol rate in the M inbound optical signals;
   changing a channel number from N channels in the N inbound optical signals to M channels in the M inbound optical signals, where N is not equal to M; and
   changing a per-channel bit rate from a first per-channel bit rate in the N inbound optical signals to a different second per-channel bit rate in the M inbound optical signals.

7. The pluggable optical host and network I/O optoelectronic module of claim 1, further comprising:
   a host-side receptacle configured to receive a 2×M multiple-fiber push-on/pull-off (MPO) multi-mode fiber (MMF) connector, wherein each of the M inbound optical signals is emitted through the 2×M MPO MMF connector onto a corresponding one of M inbound MMF optical fibers and each of the M outbound optical signals is received through the 2×M MPO MMF connector from a corresponding one of M outbound MMF optical fibers; and
   a network-side receptacle configured to receive a 2×1 Little Connector (LC) connector, wherein the N inbound optical signals are received through the 2×1 LC connector from a first single-mode fiber (SMF) on which the N inbound optical signals are wavelength multiplexed and the N outbound optical signals are emitted through the 2×1 LC connector into a second SMF on which the N outbound optical signals are wavelength multiplexed.

8. The pluggable optical host and network I/O optoelectronic module of claim 7, further comprising:
   a 1×N wavelength division demultiplexer positioned in an optical path of the N inbound optical signals between the 2×1 LC connector and the first OEO converter; and
   an N×1 wavelength division multiplexer positioned in an optical path of the N outbound optical signals between the 2×1 LC connector and the second OEO converter.

9. The pluggable optical host and network I/O optoelectronic module of claim 1, wherein:
   the first signal processing circuitry includes:
   an N-channel receive (RX) demodulation and detection block communicatively coupled to the N network-side optical receivers;
   an N-to-M gearbox communicatively coupled to the N-channel RX demodulation and detection block;
   an M-channel transmit (TX) modulation block communicatively coupled to the N-to-M gearbox; and
   an M-channel driver communicatively coupled to the M-channel TX modulation block and to the M host-side optical transmitters; and
   the second signal processing circuitry includes:
   an M-channel RX demodulation and detection block communicatively coupled to the M host-side optical receivers;
   an M-to-N gearbox communicatively coupled to the M-channel RX demodulation and detection block;

an N-channel TX modulation block communicatively coupled to the M-to-N gearbox; and
an N-channel driver communicatively coupled to the N-channel TX modulation block and to the N network-side optical transmitters.

10. The pluggable optical host and network I/O optoelectronic module of claim 9, wherein:
the first signal processing circuitry further includes:
an N-channel analog-to-digital converter (ADC) coupled between the N network-side optical receivers and the N-channel RX demodulation and detection block; and
an M-channel digital-to-analog converter (DAC) coupled between the M-channel TX modulation block and the M-channel driver;
the second signal processing circuitry further includes:
an M-channel ADC coupled between the M host-side optical receivers and the M-channel RX demodulation and detection block; and
an N-channel DAC coupled between the N-channel TX modulation block and the N-channel driver;
the M-channel driver comprises an M-channel linear driver; and
the N-channel driver comprises an N-channel linear driver.

11. A method of communicating optical signals between a network and a host in a pluggable optical host and network I/O optoelectronic module, the method comprising:
receiving N inbound optical signals from a network;
converting the N inbound optical signals, each comprising a 50 gigabaud (GBaud) optical data signal with PAM-4 modulation, to M inbound optical signals, each comprising a 100 gigabit per second optical data signal with non-return to zero (NRZ) modulation;
emitting the M inbound optical signals to a host;
receiving M outbound optical signals from the host;
converting the M outbound optical signals, each comprising a 100 gigabit per second optical data signal with NRZ modulation, to N outbound optical signals, each comprising a 50 GBaud optical data signal with PAM-4 modulation; and
emitting the N outbound optical signals to the network.

12. A pluggable optical host and network I/O optoelectronic module comprising:
N network-side optical receivers configured to receive N inbound optical signals and to convert the N inbound optical signals to N inbound electrical signals;
first signal processing circuitry communicatively coupled to the N network-side optical receivers and configured to convert the N inbound electrical signals to M inbound electrical signals;
M host-side optical transmitters communicatively coupled to the first signal processing circuitry and configured to receive the M inbound electrical signals and to convert the M inbound electrical signals to M inbound optical signals;
M host-side optical receivers configured to receive M outbound optical signals and to convert the M outbound optical signals to M outbound electrical signals;
second signal processing circuitry communicatively coupled to the M host-side optical receivers and configured to convert the M outbound electrical signals to N outbound electrical signals;
N network-side optical transmitters communicatively coupled to the second signal processing circuitry and configured to receive the N outbound electrical signals and to convert the N outbound electrical signals to N outbound optical signals;
a host-side receptacle configured to receive a 2×M multiple-fiber push-on/pull-off (MPO) multi-mode fiber (MMF) connector, wherein each of the M inbound optical signals is emitted through the 2×M MPO MMF connector onto a corresponding one of M inbound MMF optical fibers and each of the M outbound optical signals is received through the 2×M MPO MMF connector from a corresponding one of M outbound MMF optical fibers; and
a network-side receptacle configured to receive a 2×1 Little Connector (LC) connector, wherein the N inbound optical signals are received through the 2×1 LC connector from a first single-mode fiber (SMF) on which the N inbound optical signals are wavelength multiplexed and the N outbound optical signals are emitted through the 2×1 LC connector into a second SMF on which the N outbound optical signals are wavelength multiplexed.

13. The pluggable optical host and network I/O optoelectronic module of claim 12, wherein:
each of the N inbound optical signals and each of the N outbound optical signals comprises a 50 gigabaud (GBaud) optical data signal with PAM-4 modulation;
each of the M outbound optical signals and each of the M inbound optical signals comprises a 100 gigabit per second optical data signal with non-return to zero (NRZ) modulation.

14. The pluggable optical host and network I/O optoelectronic module of claim 12, wherein:
the first signal processing circuitry includes:
N network-side post amplifiers communicatively coupled to the N network-side optical receivers;
a first clock and data recovery circuit (CDR) communicatively coupled to the N network-side post amplifiers; and
M host-side drivers communicatively coupled to the first CDR and to the M host-side optical transmitters; and
the second signal processing circuitry includes:
M host-side post amplifiers communicatively coupled to the M host-side optical receivers;
a second CDR communicatively coupled to the M host-side post amplifiers; and
N network-side drivers communicatively coupled to the second CDR and to the N network-side optical transmitters.

15. The pluggable optical host and network I/O optoelectronic module of claim 14, wherein:
N is not equal to M;
the first signal processing circuitry further includes an N-to-M gearbox coupled between the first CDR and the M host-side drivers; and
the second signal processing circuitry further includes an M-to-N gearbox coupled between the second CDR and the N network-side drivers.

16. A pluggable optical host and network I/O optoelectronic module comprising:
N network-side optical receivers configured to receive N inbound optical signals and to convert the N inbound optical signals to N inbound electrical signals;
first signal processing circuitry communicatively coupled to the N network-side optical receivers and configured to convert the N inbound electrical signals to M inbound electrical signals;
M host-side optical transmitters communicatively coupled to the first signal processing circuitry and configured to receive the M inbound electrical signals and to convert the M inbound electrical signals to M inbound optical signals;

M host-side optical receivers configured to receive M outbound optical signals and to convert the M outbound optical signals to M outbound electrical signals;

second signal processing circuitry communicatively coupled to the M host-side optical receivers and configured to convert the M outbound electrical signals to N outbound electrical signals; and N network-side optical transmitters communicatively coupled to the second signal processing circuitry and configured to receive the N outbound electrical signals and to convert the N outbound electrical signals to N outbound optical signals, wherein:

each of the N inbound optical signals and each of the N outbound optical signals comprises a 50 gigabaud (GBaud) optical data signal with PAM-4 modulation;

each of the M outbound optical signals and each of the M inbound optical signals comprises a 100 gigabit per second optical data signal with non-return to zero (NRZ) modulation.

17. The pluggable optical host and network I/O optoelectronic module of claim 16, wherein:

the first signal processing circuitry includes:

N network-side post amplifiers communicatively coupled to the N network-side optical receivers;

a first clock and data recovery circuit (CDR) communicatively coupled to the N network-side post amplifiers; and M host-side drivers communicatively coupled to the first CDR and to the M host-side optical transmitters; and the second signal processing circuitry includes:

M host-side post amplifiers communicatively coupled to the M host-side optical receivers;

a second CDR communicatively coupled to the M host-side post amplifiers; and

N network-side drivers communicatively coupled to the second CDR and to the N network-side optical transmitters.

18. The pluggable optical host and network I/O optoelectronic module of claim 16, further comprising:

a host-side receptacle configured to receive a 2×M multiple-fiber push-on/pull-off (MPO) multi-mode fiber (MMF) connector, wherein each of the M inbound optical signals is emitted through the 2×M MPO MMF connector onto a corresponding one of M inbound MMF optical fibers and each of the M outbound optical signals is received through the 2×M MPO MMF connector from a corresponding one of M outbound MMF optical fibers; and a network-side receptacle configured to receive a 2×1 Little Connector (LC) connector, wherein the N inbound optical signals are received through the 2×1 LC connector from a first single-mode fiber (SMF) on which the N inbound optical signals are wavelength multiplexed and the N outbound optical signals are emitted through the 2×1 LC connector into a second SMF on which the N outbound optical signals are wavelength multiplexed.

19. The pluggable optical host and network I/O optoelectronic module of claim 16, wherein N and M are each equal to 16.

* * * * *